(12) United States Patent
Soetaert et al.

(10) Patent No.: US 9,707,574 B2
(45) Date of Patent: Jul. 18, 2017

(54) DIVERTER VALVE ASSEMBLY AND SHOWER SYSTEM

(71) Applicant: Kohler Co., Kohler, WI (US)

(72) Inventors: Michael J. Soetaert, Sheboygan, WI (US); Jeffrey A. Schumacher, Port Washington, WI (US); William R. Bares, Fredonia, WI (US)

(73) Assignee: Kohler Co., Kohler, WI (US)

( * ) Notice: Subject to any disclaimer, the term of this patent is extended or adjusted under 35 U.S.C. 154(b) by 174 days.

(21) Appl. No.: 14/305,498

(22) Filed: Jun. 16, 2014

(65) Prior Publication Data

US 2015/0360243 A1    Dec. 17, 2015

(51) Int. Cl.

| | | |
|---|---|---|
| *B05B 1/18* | (2006.01) | |
| *E03C 1/04* | (2006.01) | |
| *F16K 11/044* | (2006.01) | |
| *B05B 1/16* | (2006.01) | |
| *B05B 1/20* | (2006.01) | |

(52) U.S. Cl.
CPC .............. *B05B 1/18* (2013.01); *B05B 1/1618* (2013.01); *E03C 1/0408* (2013.01); *F16K 11/0445* (2013.01); *B05B 1/20* (2013.01); *E03C 2201/30* (2013.01); *Y10T 29/49409* (2015.01)

(58) Field of Classification Search
CPC ....... F16K 11/044; F16K 11/0445; B05B 1/18
USPC .................................................... 4/615, 601
See application file for complete search history.

(56) References Cited

U.S. PATENT DOCUMENTS

| | | | |
|---|---|---|---|
| 901,728 | A | 10/1908 | Newton |
| 1,193,302 | A | 8/1916 | Seltner |
| 3,011,520 | A | 12/1961 | Barkelew |
| 3,034,138 | A | 5/1962 | Filliung |
| 3,471,872 | A | 10/1969 | Symmons |
| 4,752,975 | A | 6/1988 | Yates |
| 5,220,697 | A | 6/1993 | Birchfield |
| 5,329,650 | A | 7/1994 | Zaccai et al. |
| 5,408,709 | A | 4/1995 | Lockwood |
| 6,618,872 | B1 | 9/2003 | Fan |
| 7,134,614 | B2 | 11/2006 | Miyake et al. |

(Continued)

FOREIGN PATENT DOCUMENTS

| | | |
|---|---|---|
| WO | 9002282 A1 | 3/1990 |
| WO | 9210620 A1 | 6/1992 |

(Continued)

OTHER PUBLICATIONS

"Soffione Zoe Renovation H92405-H92410", Instruction Manual, 8 pages, known at least as early as Oct. 8, 2013, Brossini S.p.a., Brescia, Italy.

(Continued)

*Primary Examiner* — Janie Loeppke
(74) *Attorney, Agent, or Firm* — Michael Best & Friedrich LLP

(57) ABSTRACT

A shower system and diverter valve assembly. The shower system includes two shower devices. The diverter valve assembly may include a pull diverter valve assembly coupled between a shower arm and a hand shower hose. In operation, by applying a force (e.g., a pulling force), the pull diverter valve assembly selectively directs water flow to the shower head or to the hand shower. The diverter valve assembly may include a toggle diverter valve assembly including a portion coupled to a hand shower.

18 Claims, 11 Drawing Sheets

(56) References Cited

U.S. PATENT DOCUMENTS

| | | | |
|---|---|---|---|
| 7,143,961 B1 * | 12/2006 | Wu | E03C 1/0408 |
| | | | 239/436 |
| 7,299,510 B2 | 11/2007 | Tsai | |
| 7,308,724 B2 | 12/2007 | Ho | |
| 7,360,723 B2 | 4/2008 | Lev | |
| 7,448,403 B2 | 11/2008 | Shien | |
| 7,665,676 B2 | 2/2010 | Lev | |
| 7,694,359 B1 | 4/2010 | Hall | |
| 7,857,241 B2 | 12/2010 | Deng | |
| 7,900,295 B2 * | 3/2011 | Lev | B05B 1/1672 |
| | | | 239/444 |
| 7,937,784 B2 * | 5/2011 | Qiu | B05B 1/1618 |
| | | | 4/567 |
| 8,066,204 B2 | 11/2011 | Petrovic et al. | |
| 8,191,185 B2 | 6/2012 | Tsai | |
| 8,429,769 B2 | 4/2013 | Gross | |
| 2003/0208843 A1 | 11/2003 | Schrag | |
| 2005/0060800 A1 | 3/2005 | Fan | |
| 2006/0005311 A1 * | 1/2006 | Fentrouci | E03C 1/08 |
| | | | 4/615 |
| 2008/0022450 A1 | 1/2008 | Tsai | |
| 2009/0276953 A1 | 11/2009 | Hsu et al. | |
| 2011/0283450 A1 | 11/2011 | Fainberg | |
| 2012/0151669 A1 | 6/2012 | Wilson | |

FOREIGN PATENT DOCUMENTS

| | | |
|---|---|---|
| WO | 2004066799 A1 | 8/2004 |
| WO | 2006025875 A2 | 3/2006 |

OTHER PUBLICATIONS

"Oki Renovation", Instruction Manual, 5 pages, known at least as early as Oct. 8, 2013, Bossini S.p.a., Brescia, Italy.

Bossini—Oki 200 photos retrieved from the internet on Nov. 20, 2013, known at least as early as Oct. 8, 2013, http://www.bossini.it/en/prodotti/shower-heads/h73405-oki-o-200-renovation.

Bossini—Zoe photos retrieved from the internet on Nov. 20, 2013, known at least as early as Oct. 8, 2013, http://www.bossini.it/en/prodotti/shower-heads/h92410-zoe-o-250-renovation.

* cited by examiner

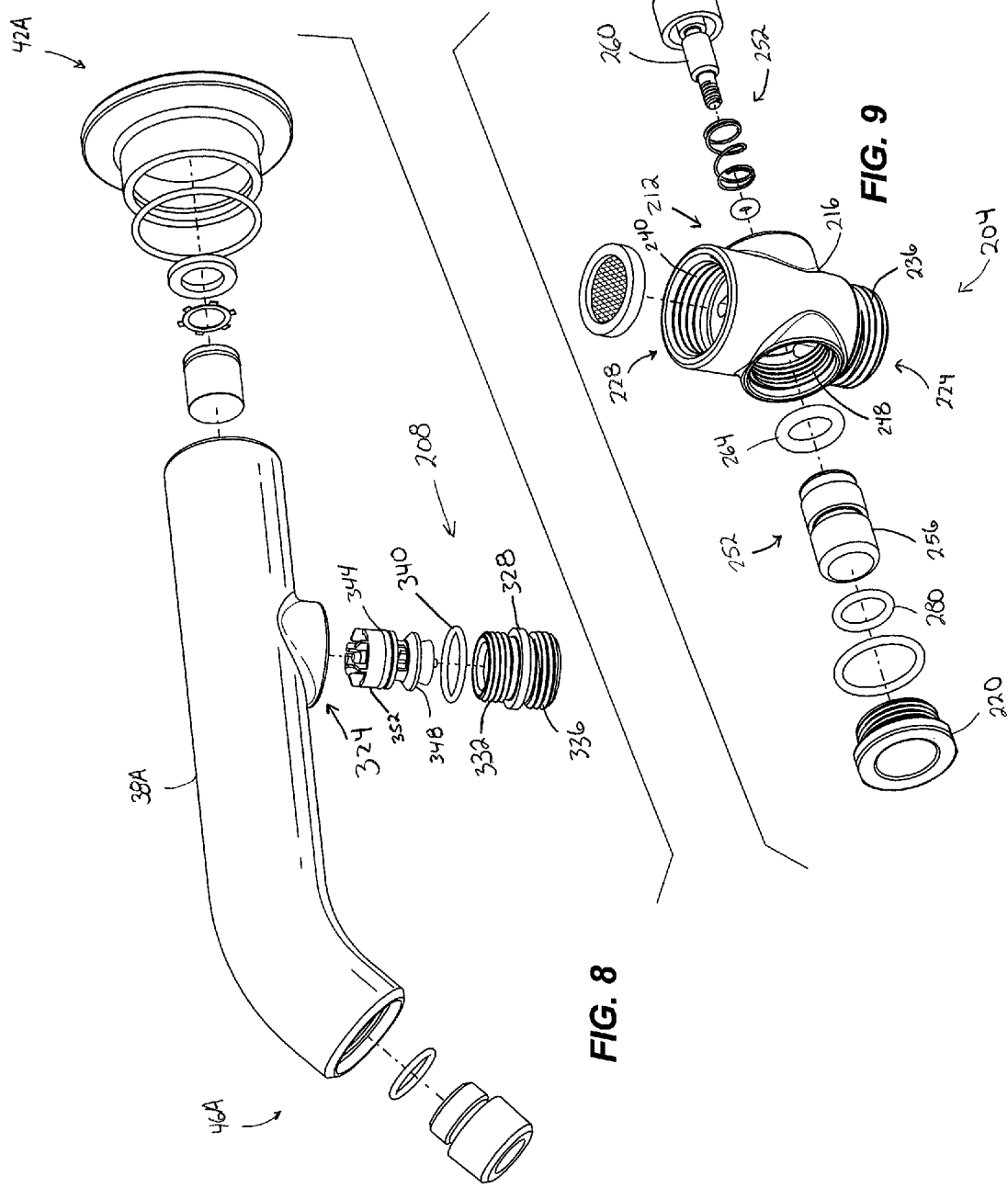

DIVERTER VALVE ASSEMBLY AND SHOWER SYSTEM

FIELD

The present invention relates to shower systems and, more particularly, to a diverter valve assembly for a shower system.

SUMMARY

Shower systems may include a shower head and a hand shower fluidly coupled to the shower head. Typically, the shower head is attached to a wall and is in fluid communication with a source of fluid (e.g., indoor plumbing receiving fluid from a well or a municipal utility). A user may select between the shower head and the hand shower by actuating a diverter valve to control where the fluid is directed. With existing systems, a user has to reach up to the shower arm to activate the diverter valve and change functions. This may be difficult for shorter users or users who cannot reach the shower arm.

In one independent aspect, a shower system may generally include a shower device defining a device outlet and a device inlet; a conduit fluidly connected between the device inlet and a water supply; a hand shower including a hand shower housing defining a hand shower outlet and a hand shower inlet, and a hose fluidly connected to the hand shower inlet; and a pull diverter valve assembly fluidly connected between the conduit and the hose, the diverter valve assembly including a housing, a first valve seat and a second valve seat, and a valve member movable relative to the housing between a first position, in which the valve member engages the first valve seat to direct water to the device inlet, and a second position, in which the valve member engages the second valve seat to direct water to the hand shower inlet, the valve member being adjustable from the first position toward the second position by a force applied to the hose.

In another independent aspect, a shower system may generally include a first shower device defining a first device outlet and a first device inlet; a second shower device defining a second device outlet and a second device inlet; and a diverter valve assembly fluidly connected between the first shower device and the second shower device, the diverter valve assembly including a housing defining a valve seat, a valve member movable relative to the housing between a first position, to direct water to the first device inlet, and a second position, to direct water to the second device inlet, and a biasing member operable to bias the valve member from the second position toward the first position.

In yet another independent aspect, a hand shower assembly may generally include a housing defining a hand shower inlet connectable to a water supply and a hand shower outlet through which water is dispensed; and a toggle diverter valve assembly including a valve housing defining a valve seat, the valve housing being one of connectable to and provided by the housing, and a valve member movable between a first position, in which the valve member engages the valve seat to substantially prevent water flow through the hand shower outlet, and a second position, in which the valve member is disengaged from the valve seat to allow water flow through the hand shower outlet, the valve member defining an axis and being supported on the valve housing for sliding movement along the axis between the first position and the second position.

In a further independent aspect, a method of retrofitting a diverter valve assembly into an existing shower system may be provided. The shower system may include a shower device defining a device outlet and a device inlet, a conduit fluidly connected between the device inlet and a water supply, and a hand shower including a hand shower housing defining a hand shower outlet and a hand shower inlet, and a hose fluidly connected between the conduit and the hand shower inlet. The diverter valve assembly may include a valve housing defining a valve seat, and a valve member movable relative to the valve housing. The method may generally include disconnecting the hose from one of the conduit and the hand shower inlet to provide fluidly disconnected components of the shower system; and connecting diverter valve assembly in fluid communication between the disconnected components to provide a fluidly connected shower system such that, in a first position of the valve member, water being directed to the device inlet, and, in a second position of the valve member, water being directed to the hand shower inlet.

In some aspects, the present shower systems include a diverter valve assembly which may be operated by the user at the hand shower, rather than at the shower arm. Also, in some aspects, the diverter valve assembly may default or be automatically reset to a position (e.g., the shower head position). In addition, in some aspects, the diverter valve assembly may be retrofit to existing shower systems.

Other independent aspects and independent advantages of the invention will become apparent by consideration of the detailed description, claims and accompanying drawings.

BRIEF DESCRIPTION OF THE DRAWINGS

FIG. 8 is an exploded view of a portion of the system of FIG. 6 including a coupler valve.

FIG. 9 is an exploded view of the toggle diverter valve assembly.

DETAILED DESCRIPTION

Figure 1:
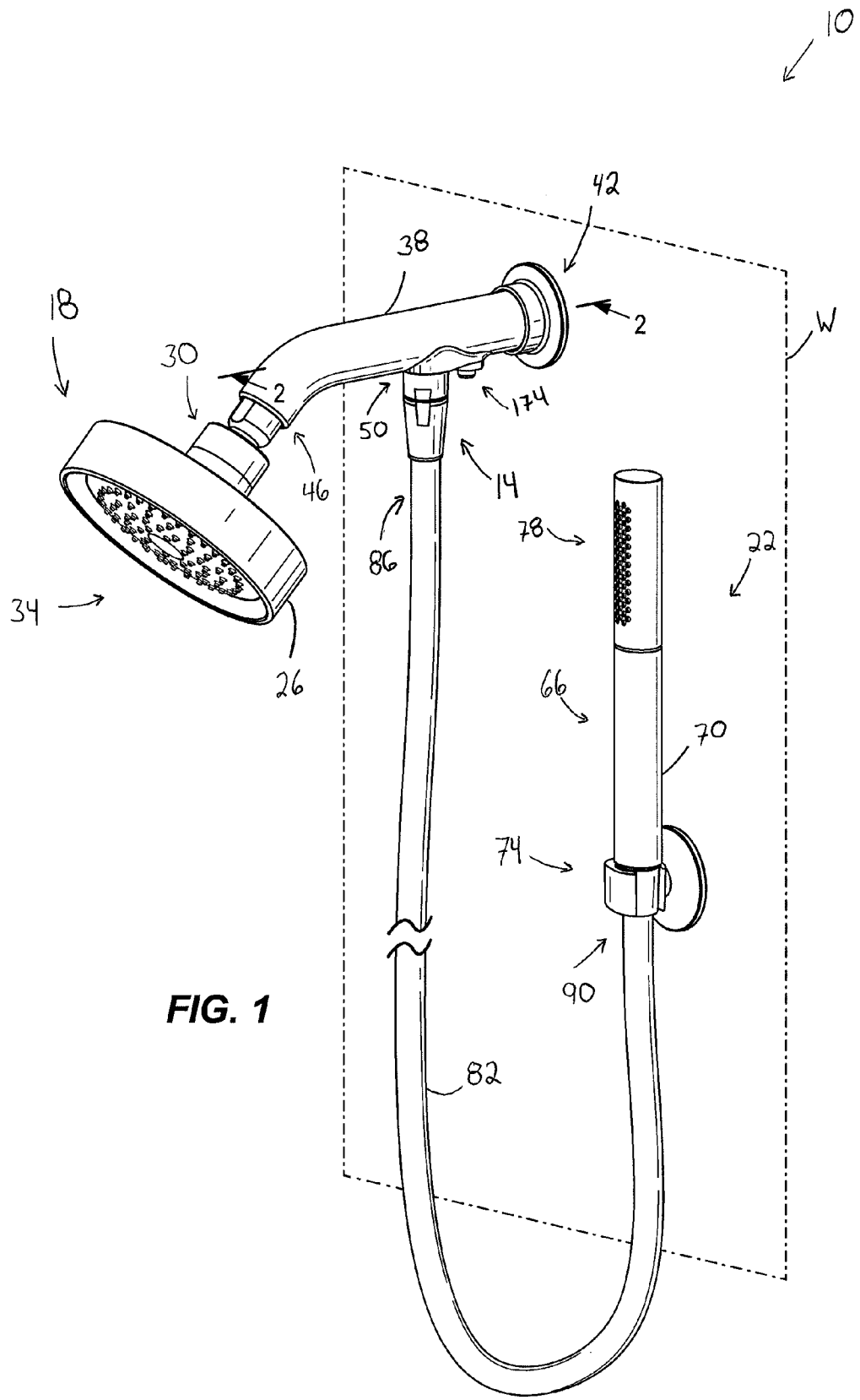
FIG. 1 is a perspective view of a shower system including a pull diverter valve assembly.
Figure 2:
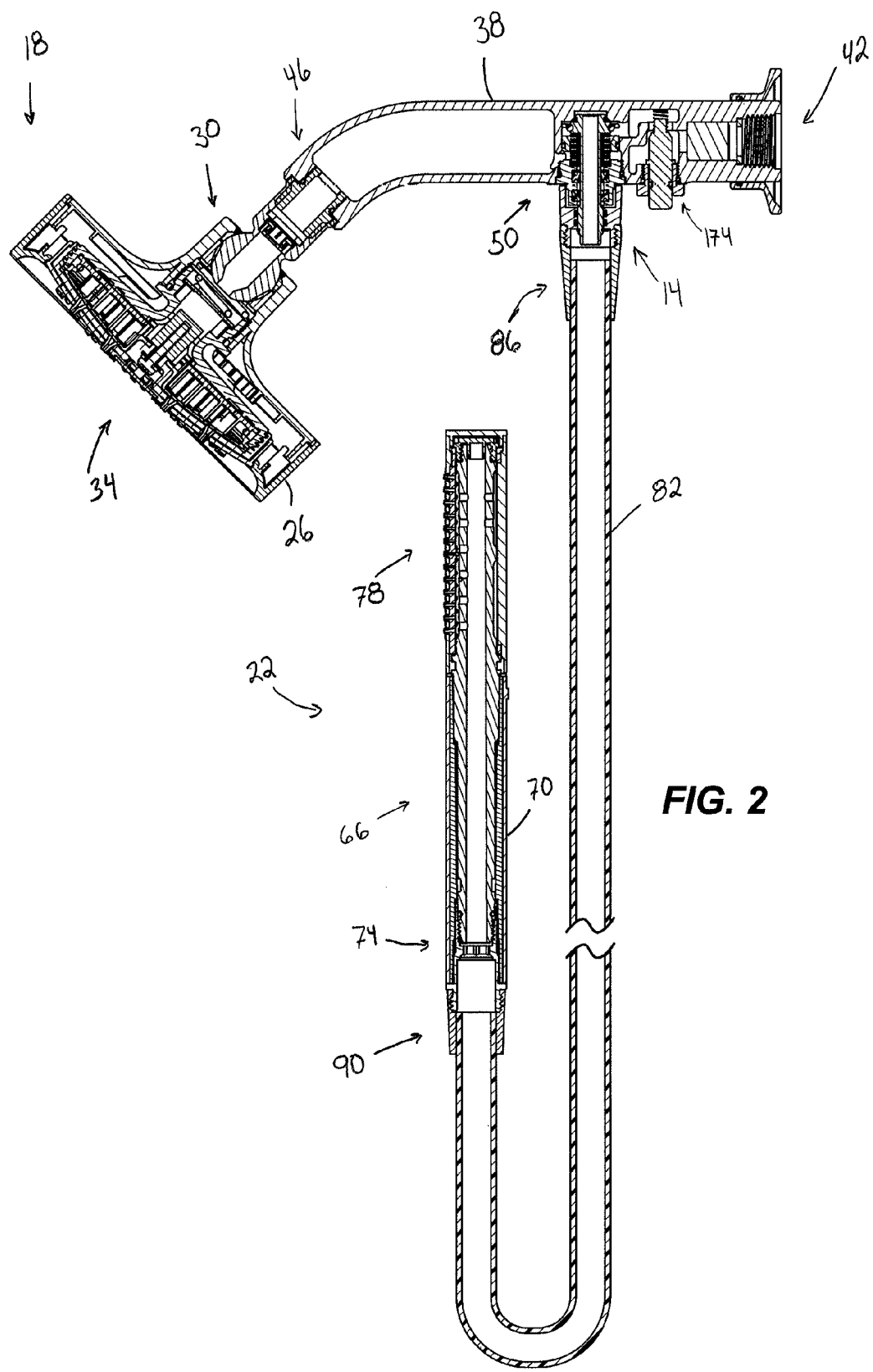
FIG. 2 is a cross sectional view of the system along section line 2-2 of FIG. 1.
Figure 3:
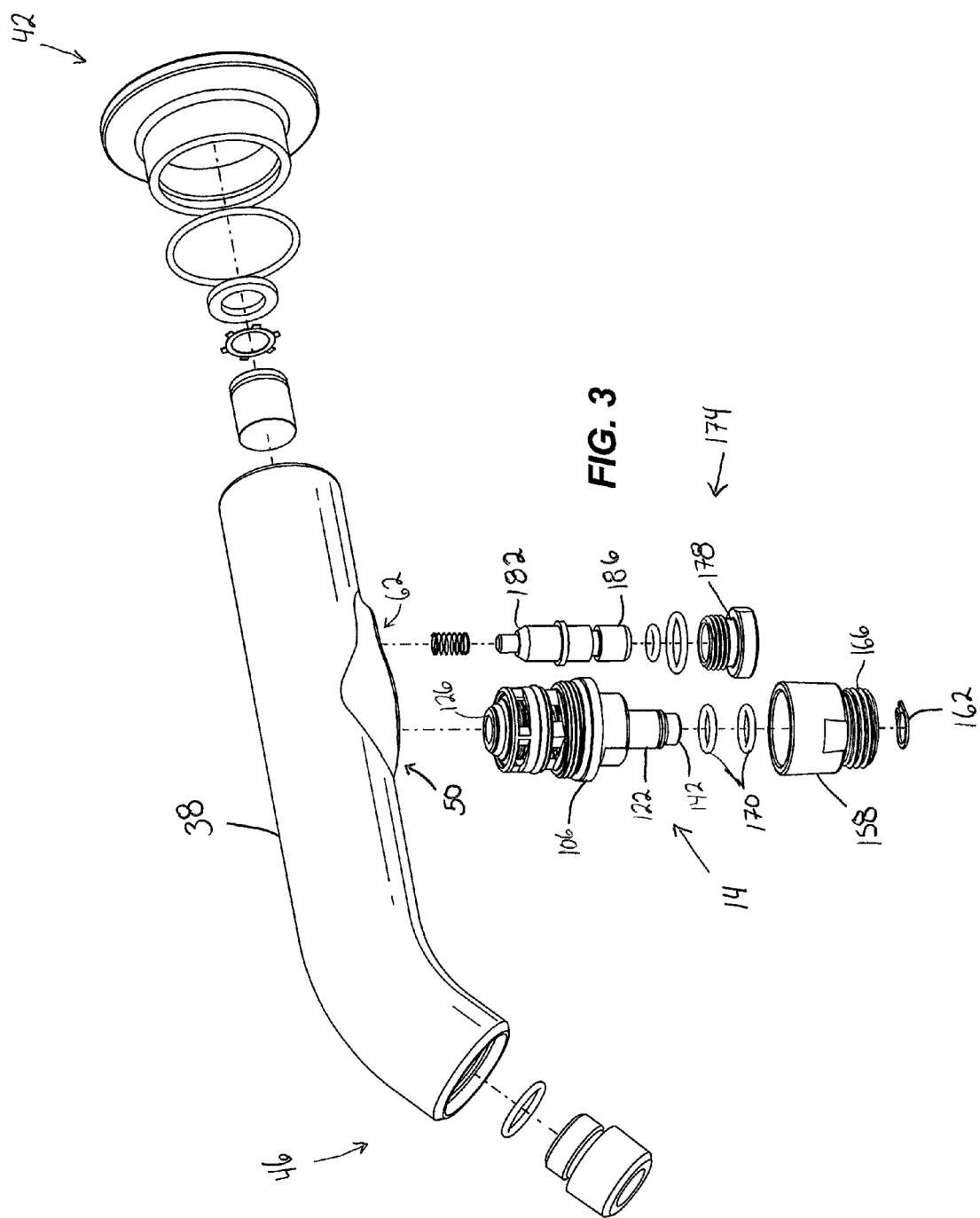
FIG. 3 is an exploded view of a portion of the system of FIG. 1 including the pull diverter valve assembly.

Before any independent embodiments of the invention are explained in detail, it is to be understood that the invention is not limited in its application to the details of construction and the arrangement of components set forth in the following description or illustrated in the following drawings. The invention is capable of other independent embodiments and of being practiced or of being carried out in various ways. Also, it is to be understood that the phraseology and terminology used herein is for the purpose of description and should not be regarded as limiting. Use of "including" and "comprising" and variations thereof as used herein is meant to encompass the items listed thereafter and equivalents thereof as well as additional items. Use of "consisting of" and variations thereof as used herein is meant to encompass only the items listed thereafter and equivalents thereof.

FIGS. 1-5 illustrate a shower system 10 including a diverter valve assembly, such as a pull diverter valve assembly 14. In the illustrated construction, the system 10 includes a shower head 18 and a hand shower 22, and the diverter valve assembly 14 is operable to selectively direct water flow to the shower head 18 or the hand shower 22. It should be understood that, in other constructions (not shown), the shower head 18 and/or the hand shower 22 may include a different shower device, such as, for example, a different shower head, a different hand shower, a rain can, a tile shower, a bath spout, etc.

The shower head 18 includes a shower head housing 26 defining a shower head inlet 30 for receiving water and a shower head outlet 34 (e.g., one or more nozzles) for dispensing water into the shower enclosure. A conduit connects the inlet 30 to a water supply (not shown). In the illustrated construction, the conduit is provided in a shower arm 38 which supports the shower head 18 in the shower enclosure (e.g., on a wall W).

The shower arm 38 has an inlet 42 in fluid communication with the water supply, a shower head outlet 46 and a hand shower outlet 50. The shower arm 38 defines valve seats 54, 58 and an opening 62 proximate the valve seat 58.

The hand shower 22 includes a hand shower housing 66 providing a handle 70 and defining a hand shower inlet 74 for receiving water and a hand shower outlet 78 for dispensing water into the shower enclosure. A flexible hose 82 includes a hose inlet 86 and a hose outlet 90 connected to the hand shower inlet 74.

The pull diverter valve assembly 14 has a valve inlet 94 in fluid communication with the water supply, a valve shower head outlet 98 in fluid communication with the shower head inlet 30, and a valve hand shower outlet 102 in fluid communication with the hand shower inlet 74 (through the hose 82). The diverter valve assembly 14 selectively provides, in a shower head mode, a shower flow path S (shown in FIG. 4) from the valve inlet 94 through the outlet 98 to the shower head inlet 30 and, in a hand shower mode, a hand shower flow path H (shown in FIG. 5) from the valve inlet 94 through the outlet 102 to the hand shower inlet 74.

The diverter valve assembly 14 includes a valve housing 106 connected to the shower arm 38, for example, by threads 110. Seals (e.g., O-rings 114) are provided between the housing 106 and the shower arm 38. The diverter valve assembly 14 also includes valve seats 54, 118 selectively engageable by a valve member 122 to select the flow path S or H and the corresponding mode of the system 10. In the illustrated construction, the valve seat 54 is provided in the shower arm 38, and the valve seat 118 is provided by the valve housing 106.

The valve member 122 includes a head 126 supporting generally opposite facing seals 130, 134 (e.g., O-rings). The illustrated valve member 122 is generally tube-shaped and defines a through passage 138 extending through the head 126 and to a passage outlet 142. A passage 146 is defined around an intermediate portion of the valve member 122.

Figure 4:
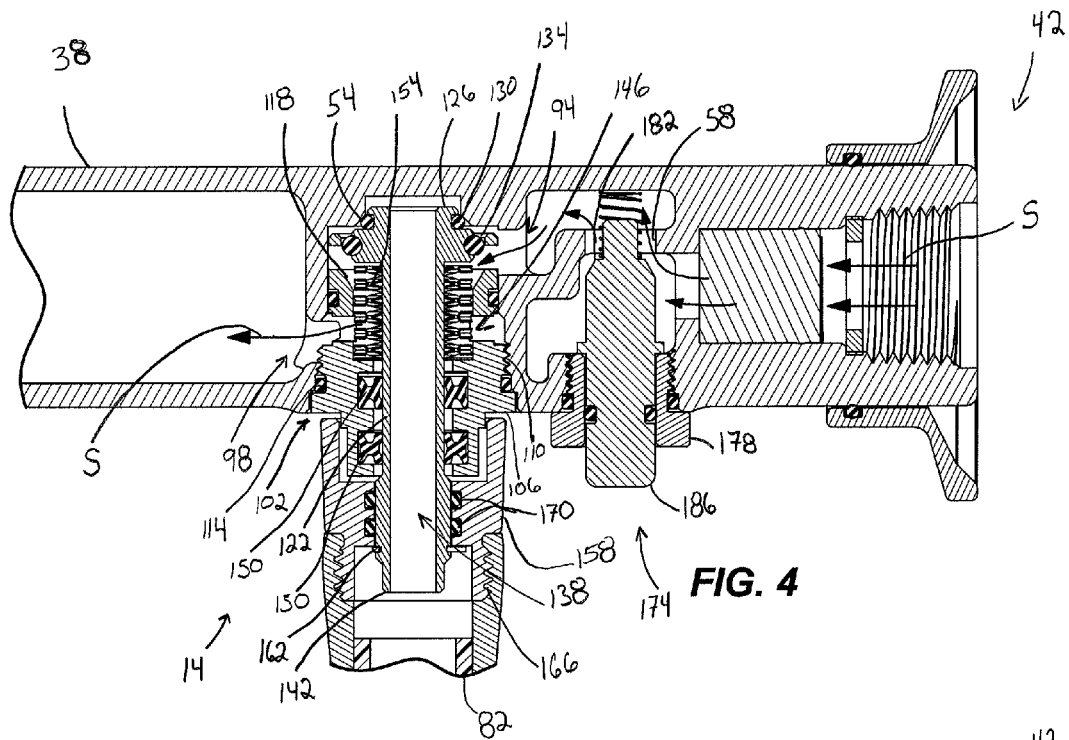
FIG. 4 is a partial cross sectional view of the system with the pull diverter valve assembly in a shower head position.
Figure 5:
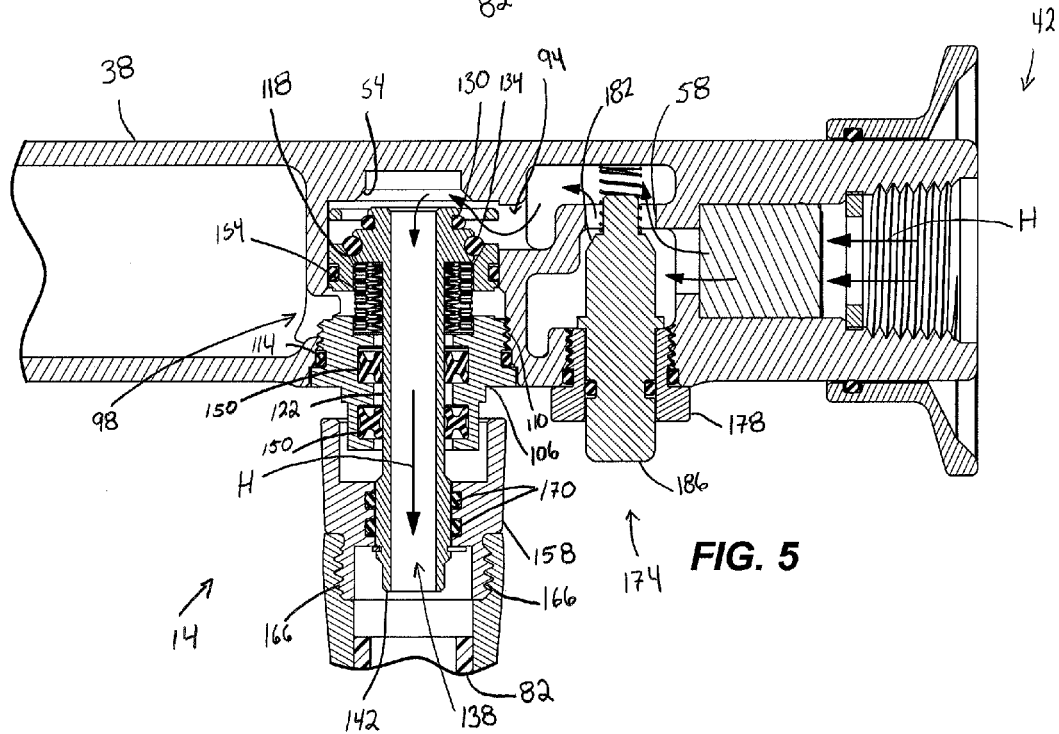
FIG. 5 is a partial cross sectional view of the system with the pull diverter valve assembly in a hand shower position.
Figure 6:
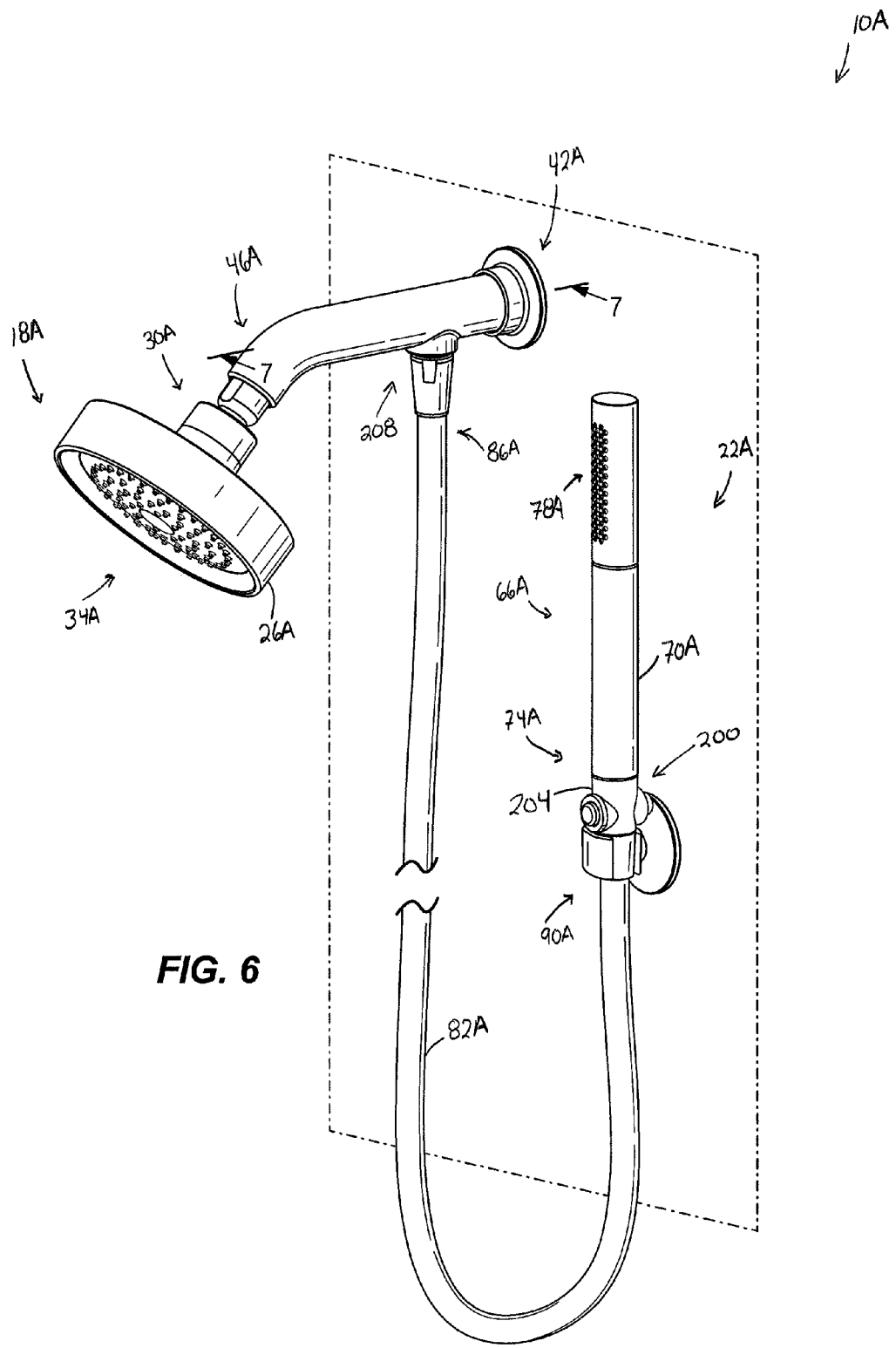
FIG. 6 is a perspective view of a shower system including a toggle diverter valve assembly.
Figure 7:
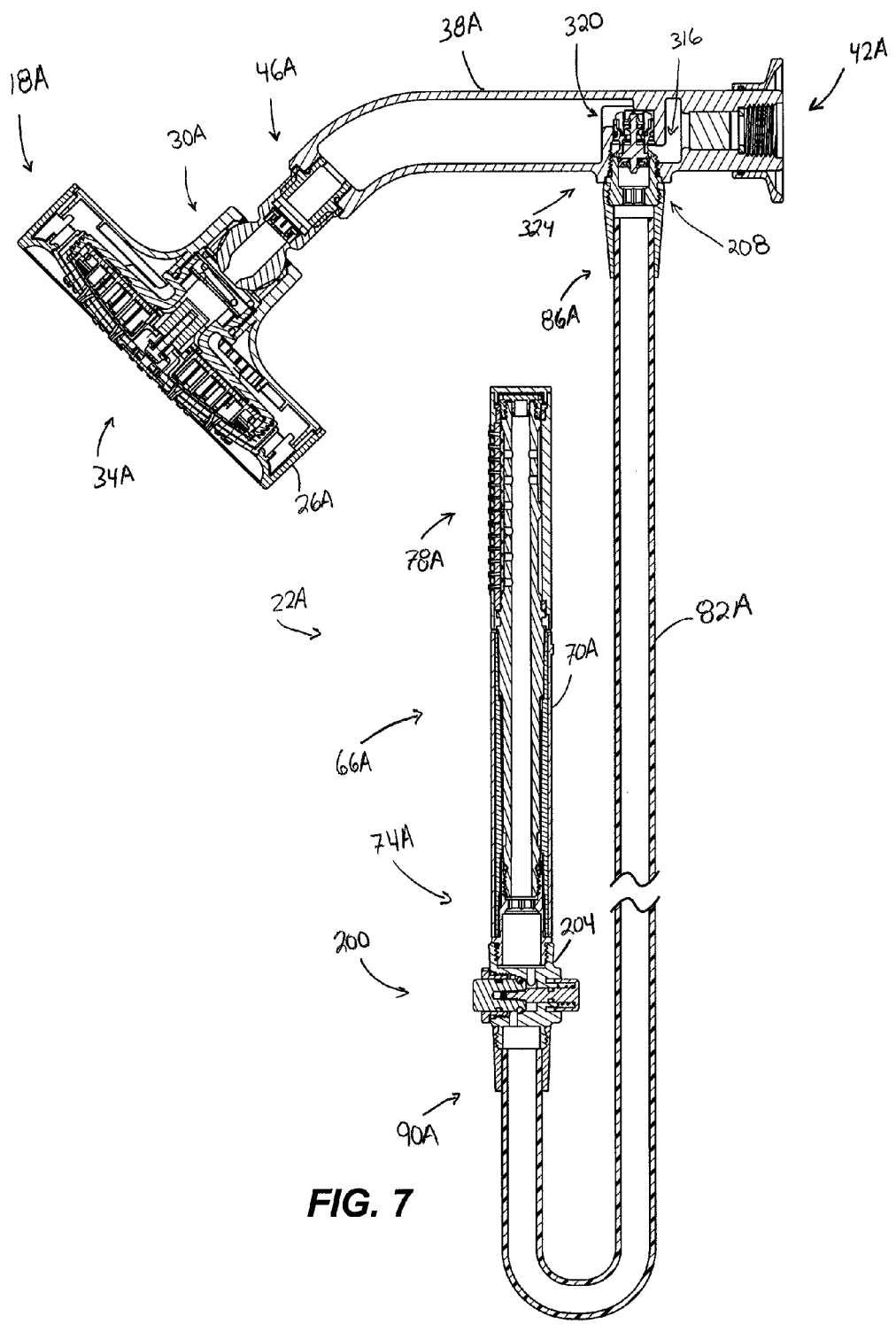
FIG. 7 is a cross sectional view of the system along section line 7-7 of FIG. 6.
Figure 10:
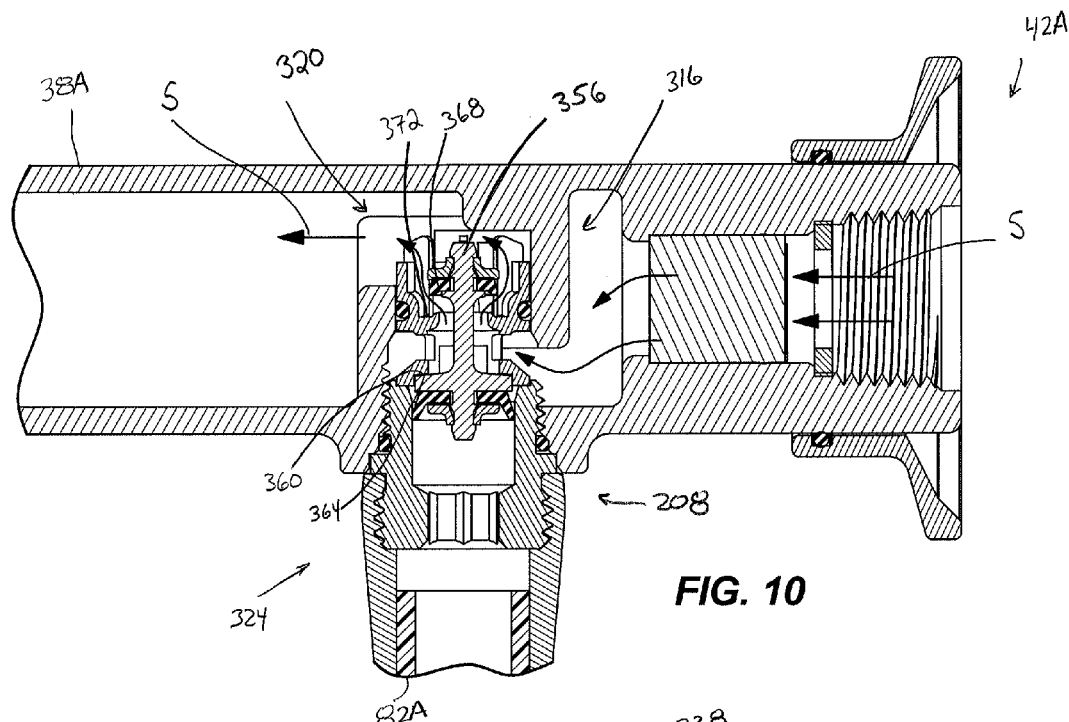
FIG. 10 is an enlarged view of a portion of the cross sectional view of FIG. 7 showing the coupler valve in a shower head position.

The valve member 122 is supported in the valve housing 106 for movement between a shower head position (shown in FIG. 4) and a hand shower position (shown in FIG. 5). Seals 150 (e.g., quad rings, O-rings, etc.) accommodate movement between the valve member 122 and the valve housing 106. A biasing member 154 (e.g., one or more springs) biases the valve member 122 toward a position (e.g., the shower head position shown in FIG. 4) to provide an auto-reset or default position for the shower system 10. In the illustrated construction, the biasing member 154 surrounds a portion of the valve member 122 and is positioned at least partially in the passage 146.

The valve member 122 is connected to the hose 82 for movement therewith by a coupling adapter 158. A first connection (e.g., a clip 162) connects the valve member 122 and the adapter 158, and a second connection (e.g., threads 166) connects the adapter 158 to the hose 82. Seals (e.g., O-rings 170) are provided between the valve member 122 and the adapter 158 to seal the fluid interface between the valve member 122, the adapter 158 and the hose 82.

The valve member 122 is movable by applying a force to the hose 82. For example, to move the valve member 122 from the shower head position (FIG. 4) to the hand shower position (FIG. 5), a user applies a pulling force (downward in FIGS. 4-5) to the hose 82. A pushing force (e.g., upward in FIGS. 4-5) may be applied to the adapter 158 or to the hose 82 (if the hose 82 is sufficiently rigid) to move the valve member 122 from the hand shower position (FIG. 5) to the shower head position (FIG. 4). This pushing force is generally dependent upon the water pressure acting on the valve member 122 (e.g., the higher the water pressure, the higher the pushing force).

In the shower head position (FIG. 4), the seal 130 engages the valve seat 54, fluidly disconnecting the passage 138 from the valve inlet 94, and the valve inlet 94 is in fluid communication with the valve shower head outlet 98 through the passage 146. Water thus can flow along the shower flow path S to be dispensed through the shower head outlet 34.

In the hand shower position (FIG. 5), the seal 134 engages the valve seat 118, fluidly disconnecting the passage 146 from the valve inlet 94, and the valve inlet 94 is in fluid communication with the valve hand shower outlet 102 through the passage 138. Water thus can flow along the hand shower flow path H to be dispensed through the hand shower outlet 78.

In the hand shower position, water pressure on the valve member 122 (e.g., acting on surfaces of the head 126 from the seal 134 to the inlet of the passage 138) resists the force of the biasing member 154 to maintain the valve member 122 in this position. When the water pressure is removed (e.g., when the flow of water is turned off or interrupted), the biasing member 154 returns the valve member 122 to the shower head position (FIG. 4).

In the illustrated construction, the system 10 also includes a reset mechanism 174 operable to reset the system 10 to the shower head mode while shower system 10 is on (e.g., when the flow of water is turned on). The reset mechanism 174 includes a connector 178 connected to the shower arm 38 (e.g., by threads) in the opening 62 and movably supporting a reset valve member 182. The reset valve member 182 is selectively movable into engagement with a valve seat (e.g., the valve seat 58) to interrupt the flow of water to the diverter valve assembly 14 (a "flow interrupt" position). If the system 10 is in the hand shower mode (FIG. 5), when water flow to the diverter valve assembly 14 is interrupted, the water pressure on the valve member 122 resisting the force of the biasing member 154 is removed, and the biasing member 154 returns the valve member 122 to the shower head position (FIG. 4).

The reset valve member 182 is biased out of engagement with the valve seat 58 to normally allow water flow in the shower arm 38. A reset button 186 is engageable by the user to move the valve member 182 into engagement with the valve seat 58 while the reset valve member 182 is held in the flow interrupt position.

FIGS. 6-13 illustrate an alternative construction of a shower system 10A. The shower system 10A similar to the shower system 10 described above and shown in FIGS. 1-5. Common elements have the same reference number "A."

The shower system 10A includes a different diverter valve assembly, such as a toggle diverter valve assembly 200. The toggle diverter valve assembly 200 includes a hand shower diverter portion 204 at the hand shower 22A and a shower diverter portion 208 at the shower arm 38A. The hose 82A fluidly couples the hand shower diverter portion 204 and the shower diverter portion 208.

The hand shower diverter portion 204 is connected to the hand shower 22A and includes a valve housing assembly 212 having a first housing portion 216 and a second housing portion 220. In the illustrated construction, the second housing portion 220 is separate from and connected to the first housing portion 216 (e.g., by threads). In other constructions (not shown), the valve housing assembly 212 may be formed as a single piece.

The first housing portion 216 defines an inlet 224, an outlet 228 and a valve seat 232 (see FIGS. 11 and 13) between the inlet 224 and the outlet 228. The first housing portion 216 provides a connection (e.g., threads 236, 240) with the hose 82A and the hand shower housing 66A. The first housing portion 216 defines an annular groove 244, and the second housing portion 220 is connected on the opposite side of the first housing portion 216 (e.g., by threads 248). In other constructions (not shown), at least a portion of the valve housing assembly 212 (e.g., the first housing portion 216) may be formed with one of the connected components (e.g., with the hand shower housing 66A).

The hand shower diverter portion 204 also includes a valve member assembly 252 supported by the valve housing assembly 212 for sliding movement along the axis of the valve member assembly 252 and substantially transverse to the valve housing assembly 212 and the handle 70A. The valve member assembly 252 includes a first valve member portion 256 coupled to a second valve member portion 260.

Figure 11:
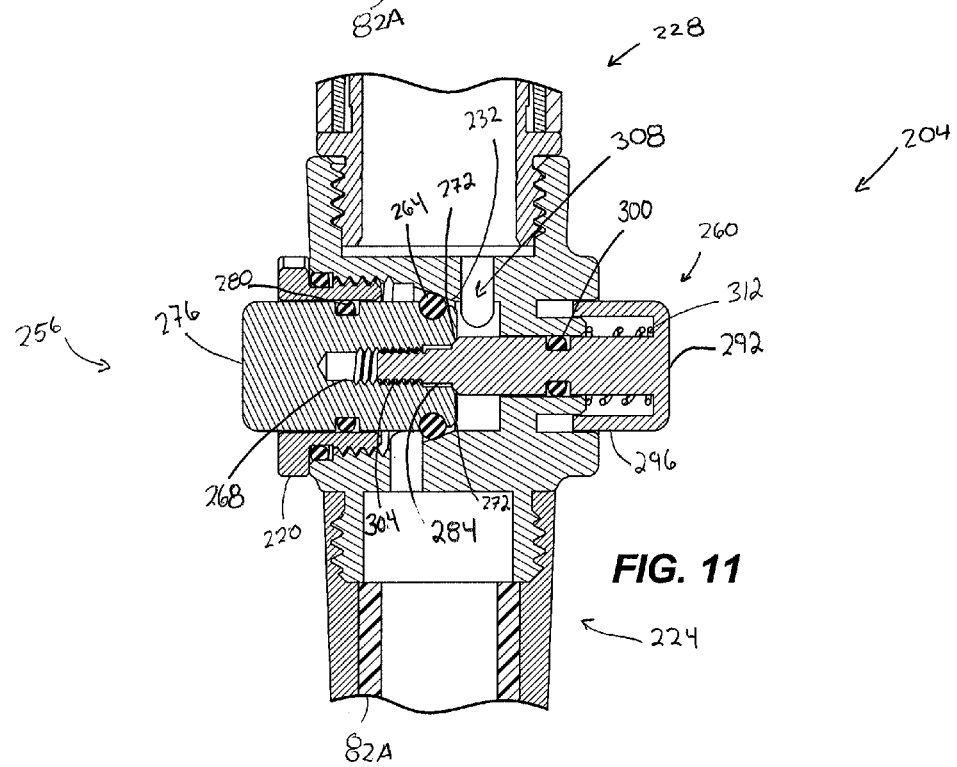
FIG. 11 is an enlarged view of a portion of the cross sectional view of FIG. 7 showing the toggle diverter valve assembly in a shower head position.

The first valve member portion 256 includes a seal 264 (e.g., O-ring) engageable with the valve seat 232 (see FIG. 11). The first valve member portion 256 defines a recess 268 with an annular shoulder 272 proximate its opening. An actuator button 276 is connected to (e.g., formed on) the first valve member portion 256. The first valve member portion 256 is supported by the second housing portion 220 for movement along the axis of the valve member assembly 252, and a seal (e.g., O-ring 280) provides a seal between these components.

The second valve member portion 260 includes a projection 284 with an annular shoulder 288 at its base. An actuator button 292 is connected to (e.g., formed on) the second valve member portion 260 and includes an annular rim 296 that is received within the annular groove 244 in the first housing portion 216. The second valve member portion 260 is supported by the first housing portion 216 for movement along the axis of the valve member assembly 252, and a seal (e.g., O-ring 300) provides a seal between these components.

In the illustrated construction, the valve member portions 256, 260 are connected, for example, by a threaded connection 304 between the recess 268 and the projection 284, and, when fully assembled, the shoulders 272, 288 engage. The valve member portions 256, 260 are assembled from opposite sides of the first housing portion 216. Engagement of the seal 264 with the valve seat 232 limits movement of the valve member assembly 252 in the direction of the second valve member portion 260, and engagement of the rim 296 in the groove 244 limits movement in the opposite direction. In other constructions (not shown), the first valve member portion 256 may be integrally formed with the second valve member portion 260.

The hand shower diverter portion 204 defines a passage 308 selectively fluidly connecting the inlet 224 and the outlet 228. The passage 308 extends around the valve member assembly 252 and through the valve housing assembly 212.

The valve member assembly 252 is supported in the valve housing assembly 212 for movement between a shower head position (shown in FIG. 11) and a hand shower position (shown in FIG. 5). A biasing member 312 (e.g., a spring) biases the valve member assembly 252 toward a position (e.g., the shower head position shown in FIG. 11) to provide an auto-reset or default position for the shower system 10A. In the illustrated construction, the biasing member 312 surrounds a portion of the second valve member portion 260 adjacent the actuator button 292 and is between the inner surface of the actuator button 292 and a facing surface of the first housing portion 216.

In the illustrated construction, the shower diverter portion 208 generally includes a check valve arrangement installed in reverse to its normal orientation. Rather than blocking backflow, the shower diverter portion 208 is used as a shutoff, and toggling the valve member assembly 252 actually opens the "check valve" to allow flow.

The shower diverter portion 208 defines an inlet 316, a shower head outlet 320 and a hand shower outlet 324. A shower diverter housing 328 (see FIG. 8) is connected to the shower arm 38A at the hand shower outlet 324 and to the hose 82A (e.g., by threads 332, 336). A seal (e.g., O-ring 340) fluidly seals the housing 328 and the shower arm 38A.

A diverter body 344 is located within the shower arm 38A defines a first valve seat 348 and a second valve seat 352. A valve member 356 includes (see FIGS. 10 and 12), generally at opposite ends, a first seal support 360 supporting a first seal 364 and a second seal support 368 supporting a second seal 372.

Figure 12:
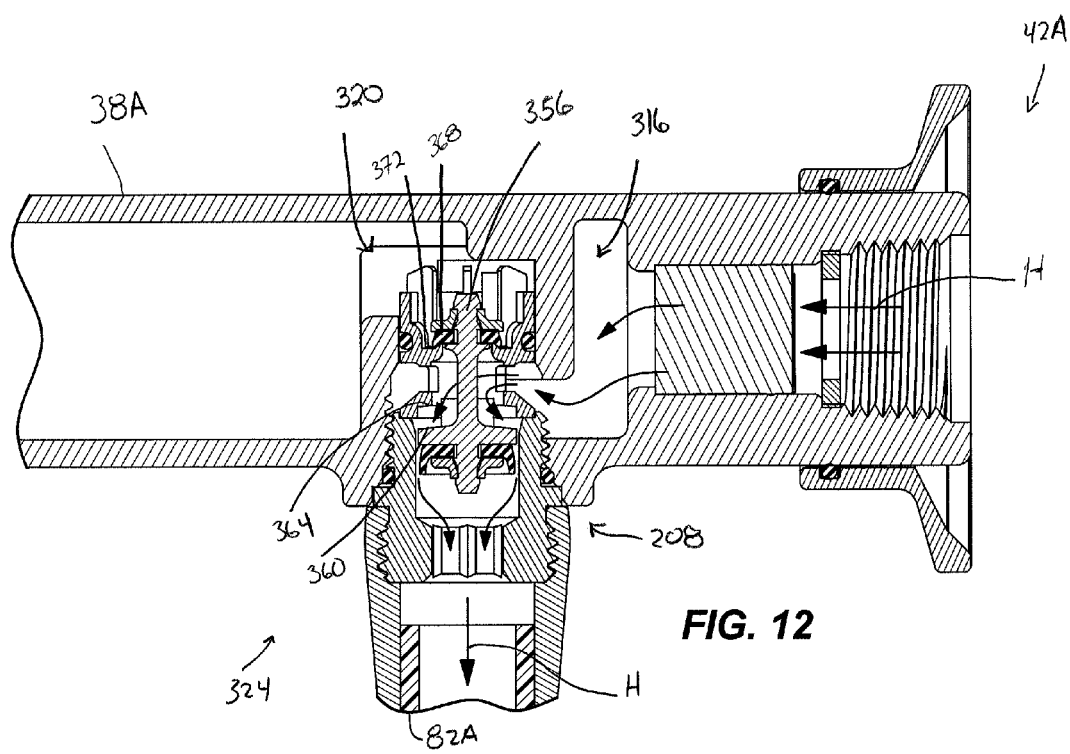
FIG. 12 is an enlarged view of a portion of the cross sectional view of FIG. 7 showing the coupler valve in a hand shower position.
Figure 13:
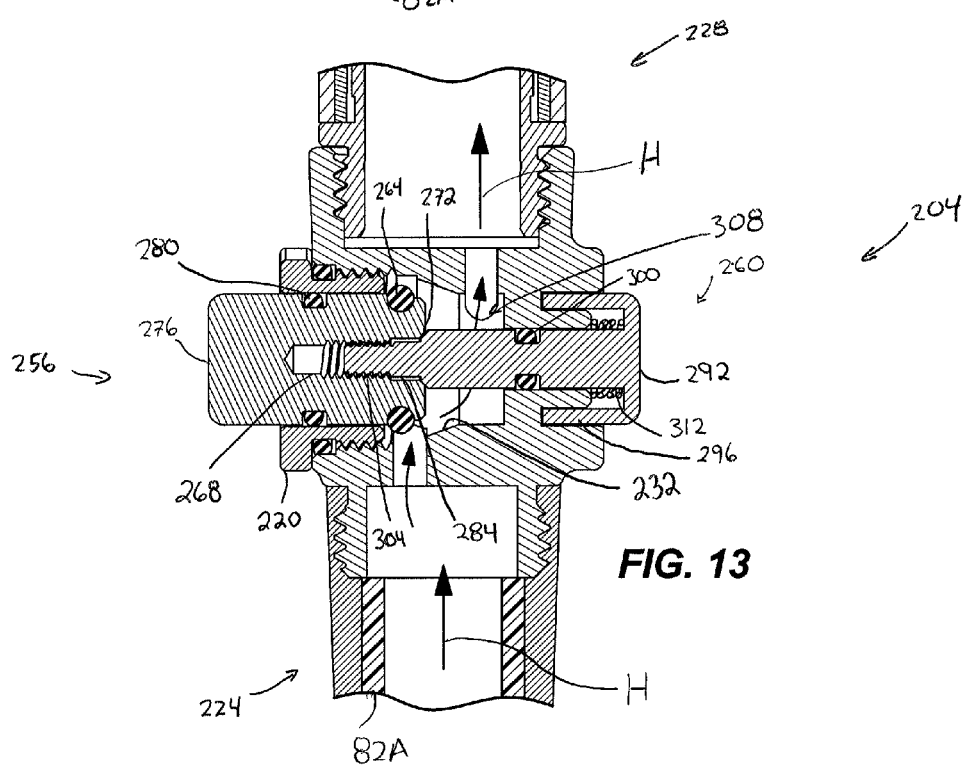
FIG. 13 is an enlarged view of a portion of the cross sectional view of FIG. 7 showing the toggle diverter valve assembly in the hand shower position.

The valve member 356 is supported for movement between a shower head position (shown in FIG. 10) and a hand shower position (shown in FIG. 12). In the shower head position (see FIG. 10), the seal support 360 engages the diverter body 344, and the seal 364 engages the valve seat 348 to fluidly disconnect the hand shower outlet 324 from the inlet 316 and fluidly connect the shower head outlet 320 to the inlet 316. In the hand shower position (FIG. 11), the seal 372 engages the valve seat 352, fluidly disconnecting the shower head outlet 320 from the inlet 316 while fluidly connecting the hand shower outlet 324 to the inlet 316.

In operation, the mode of the shower system 10A is selected by the user with the hand shower diverter portion 204, and the shower diverter portion 208 operates in response. In the shower head position (shown in FIGS. 10 and 11), the valve member assembly 252 of the hand shower diverter portion 204 is positioned with the seal 264 in engagement with the valve seat 232 (e.g., by depressing the actuator button 276 or under the biasing force of the biasing member 312) so that the inlet 224 is fluidly disconnected from the outlet 228. As a result, water pressure builds up in the hose 82A, forcing the seal support 360 to engage the diverter body 344 and the seal 364 to engage the valve seat 348, thereby fluidly disconnecting the hand shower outlet 324 from the inlet 316 and fluidly connecting the shower head outlet 320 to the inlet 316. Water thus can flow along the shower flow path $S_A$ to be dispensed through the shower head outlet 34A.

In the hand shower position (shown in FIG. 13), the valve member assembly 252 of the hand shower diverter portion 204 is positioned with the seal 264 out of engagement with the valve seat 232 (e.g., by depressing the actuator button 292) to fluidly connect the inlet 224 and the outlet 228. As a result, water pressure in the hose 82A decreases, allowing the seal support 360 to disengage the diverter body 344 and the seal 364 to disengage the valve seat 348, thereby fluidly connecting the hand shower outlet 324 and the inlet 316 (see FIG. 12). At the same time, the seal 372 engages the valve seat 352, fluidly disconnecting the shower head outlet 320 from the inlet 316. Water thus can flow along the hand shower path $H_A$ to be dispensed through the hand shower outlet 78A.

In the hand shower position, water pressure on the valve member assembly 252 resists the force of the biasing member 312 to maintain the valve member assembly 252 in this position. When the water pressure is removed (e.g., when the flow of water is turned off or interrupted), the biasing member 312 returns the valve member assembly 252 to the shower head position (FIG. 10) which will cause the valve member 356 of the shower diverter portion 208 to move to the shower head position, as described above.

FIGS. 14-17 illustrate alternative constructions of a hand shower diverter portion 204B, 204C, 204D, 204E, respectively. The hand shower diverter portions 204B-204E are similar to the hand shower diverter portion 204 described above and shown in FIGS. 6-13. Common elements have the same reference number "B", "C", "D" and "E", respectively.

Figure 14:
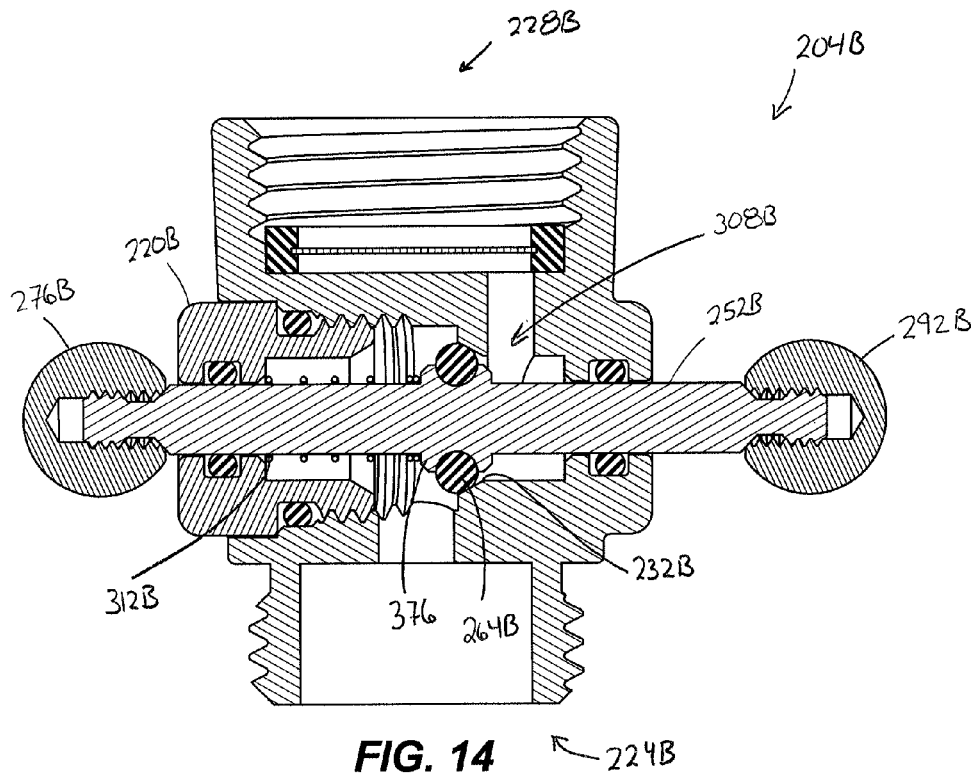
FIG. 14 is a first alternative construction of the toggle diverter valve assembly.

As shown in FIG. 14, the hand shower diverter portion 204B includes a valve member 252B having an enlarged middle portion 376 between the actuator buttons 276B, 292B. Both actuator buttons 276B, 292B are threadably coupled to the valve member 252B. The protruding middle portion 376 supports the seal 264B engageable with the valve seat 232B in the shower head position. In the illustrated construction, the biasing member 312B is between the middle portion 376 and the second housing portion 220B.

Figure 15:
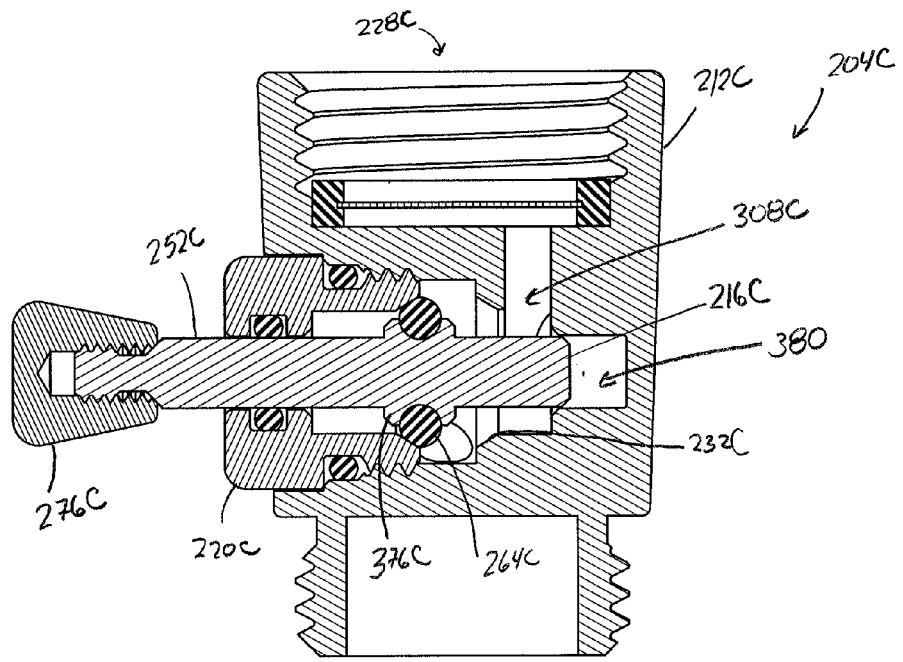
FIG. 15 is a second alternative construction of the toggle diverter valve assembly.

As shown in FIG. 15, in the hand shower diverter portion 204C, the valve member 252C includes one actuator button 276C, and the valve member 252C is not biased to a position (no biasing member is provided). The first housing portion 216C defines a cavity 380 receiving and guiding an end portion of the valve member 252C. The actuator button 276C is depressed to engage the seal 264C with the valve seat 232C (the shower head position) and pulled to disengage the seal 264C from the valve seat 232C (the hand shower position). Also, in the illustrated construction, the passage 308C passes through the valve housing assembly 212C in multiple planes. The path from the inlet 224C is offset from the path to the outlet 228C.

Figure 16:
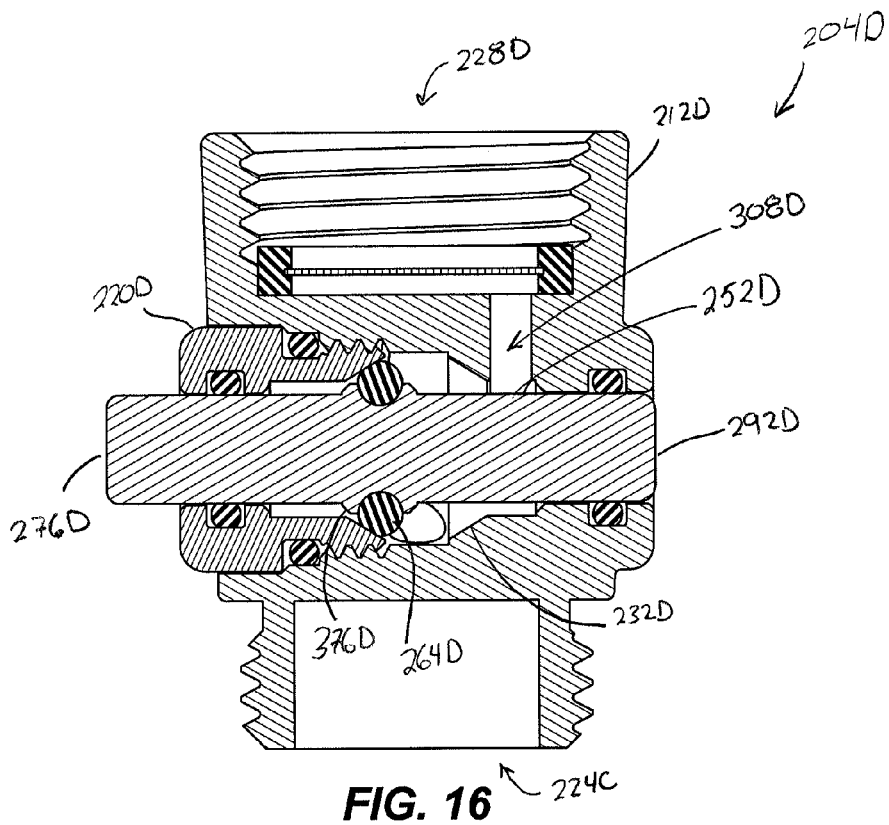
FIG. 16 is a third alternative construction of the toggle diverter valve assembly.

As shown in FIG. 16, in the hand shower diverter portion 204D, the valve member 252D is integrally formed with two actuator buttons 276D, 292D located on opposite ends. Also, the valve member 252D is not biased to a position (no biasing member is provided).

Figure 17:
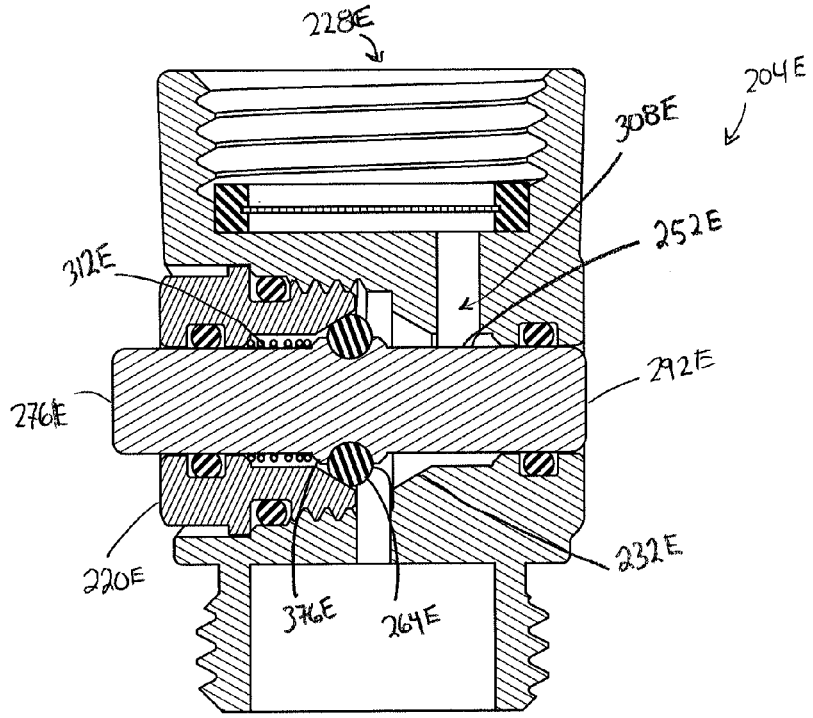
FIG. 17 is a fourth alternative construction of the toggle diverter valve assembly.

In FIG. 17, the hand shower diverter portion 204E is similar to the hand shower diverter portion 204D shown in FIG. 16. However, the second housing portion 220E is flush or nearly flush with the outer surface of the first housing portion 216E. Also, the valve member 252E is biased to a position (e.g., the shower head position) by the biasing member 312E.

One or more independent features and independent advantages of the invention may be set forth in the following claims.

What is claimed is:

1. A shower system comprising:
   a shower device defining a device outlet and a device inlet;
   a conduit fluidly connected between the device inlet and a water supply;
   a hand shower including
      a hand shower housing defining a hand shower outlet and a hand shower inlet, and
      a hose fluidly connected to the hand shower inlet; and
   a diverter valve assembly fluidly connected between the conduit and the hose, the diverter valve assembly including
      a housing,
      a first valve seat and a second valve seat, and
      a valve member movable relative to the housing between a first position, in which the valve member engages the first valve seat to direct water to the device inlet, and a second position, in which the valve member engages the second valve seat to direct water to the hand shower inlet, the valve member being adjustable from the first position toward the second position by a force applied to the hose.

2. The system of claim 1, wherein the shower device includes a shower head, and wherein the conduit includes a shower arm supporting the shower head.

3. The system of claim 1, wherein the hose defines a hose inlet connected to the valve member for movement relative to the housing between the first position and the second position.

4. The system of claim 3, wherein the valve member has an end defining a valve outlet in fluid communication with the hose inlet, and wherein the diverter valve assembly further includes a coupling fixed to the end of the valve member, the hose being threadedly connected to the coupling.

5. The system of claim 1, wherein the housing threadedly engages the conduit.

6. The system of claim 1, wherein the diverter valve assembly defines a valve inlet in fluid communication with the water supply, a first valve outlet selectively in fluid communication between the valve inlet and the device inlet, and a second valve outlet selectively in fluid communication between the valve inlet and the hand shower inlet.

7. The system of claim 6, wherein the valve member defines a passage therethrough providing the second valve outlet, in the second position, the passage being in fluid communication with the valve inlet.

8. The system of claim 6, wherein the diverter valve assembly defines a passage around a portion of the valve member to the first valve outlet, in the first position, the passage being in fluid communication with the valve inlet.

9. The system of claim 1, wherein the diverter valve assembly further includes a biasing member operable to bias the valve member toward the first position.

10. The system of claim 9, wherein the biasing member applies a biasing force to the valve member, and wherein the valve member has a surface, in the second position, water pressure acting on the surface to overcome the biasing force to maintain the valve member in the second position.

11. The system of claim 10, further comprising a reset mechanism operable to interrupt water flow to the diverter valve assembly to reduce the water pressure acting on the surface and allow the biasing member to move the valve member toward the first position.

12. The system of claim 9, wherein the biasing member includes a spring.

13. The system of claim 1, wherein the valve member includes a head portion supporting a first seal selectively engageable with the first valve seat and a second seal selectively engageable with the second valve seat.

14. The system of claim 1, wherein the diverter valve assembly is retrofittable with the shower device, the conduit and the hand shower.

15. A shower system comprising:
a first shower device including a shower head and defining a first device outlet and a first device inlet;
a second shower device including a hand shower and defining a second device outlet and a second device inlet; and
a diverter valve assembly fluidly connected between the first shower device and the second shower device, the diverter valve assembly including
a housing defining a valve seat,
a valve member movable relative to the housing between a first position, to direct water to the first device inlet, and a second position, to direct water to the second device inlet, and
a biasing member operable to apply a biasing force on the valve member to bias the valve member from the second position toward the first position, wherein the biasing member is configured to engage the valve member to apply the biasing force;
wherein the hand shower includes
a hand shower housing defining the second device outlet and the second device inlet, and
a hose fluidly connected to the second device inlet, the valve member being adjustable from the first position toward the second position by a pulling force applied to the hose overcoming a biasing force of the biasing member.

16. The system of claim 15 wherein the housing of the diverter valve assembly is one of connected to and provided by the hand shower housing, and wherein the diverter valve assembly further includes an actuator button connected to the valve member and engageable by a user to move the valve member toward the second position, the biasing member being between the housing and one of the actuator button and the valve member.

17. The system of claim 15, wherein the biasing member includes a spring.

18. The system of claim 15, wherein the diverter valve assembly is separate from and retrofittable with the first shower device and the second shower device.

* * * * *